United States Patent [19]

Hayes

[11] 4,102,073
[45] * Jul. 25, 1978

[54] ANIMAL IDENTIFICATION TAG

[76] Inventor: Norman J. Hayes, P.O. Box 618, Cody, Wyo. 82414

[*] Notice: The portion of the term of this patent subsequent to May 25, 1993, has been disclaimed.

[21] Appl. No.: 765,909

[22] Filed: Feb. 7, 1977

[51] Int. Cl.² .......................................... G09F 3/08
[52] U.S. Cl. .................................................. 40/301
[58] Field of Search .................. D30/43; 40/20, 300, 40/301, 302, 303

[56] References Cited

U.S. PATENT DOCUMENTS

| 492,838 | 3/1893 | Rogers | 40/301 |
|---|---|---|---|
| 2,539,810 | 6/1951 | Butler | 40/20 R X |
| 2,675,594 | 5/1951 | Dryden | 40/302 X |
| 3,958,353 | 5/1976 | Hayes | 40/301 |

Primary Examiner—Russell R. Kinsey
Assistant Examiner—Wenceslao J. Contreras
Attorney, Agent, or Firm—Bruce G. Klaas

[57] ABSTRACT

An animal identification tag assembly for mounting on the ear of an animal comprising a one-piece identification member adapted to be mounted on the upper outer surface of the animal ear in an upright outwardly extending position and a one-piece attachment member adapted to be mounted on the inner surface and extend through the animal ear into retaining locking engagement with the identification member, the identification member having an identification flange portion laterally offset to one side of a base portion with a reinforcement rib on the base portion having an attachment hole extending therethrough.

29 Claims, 12 Drawing Figures

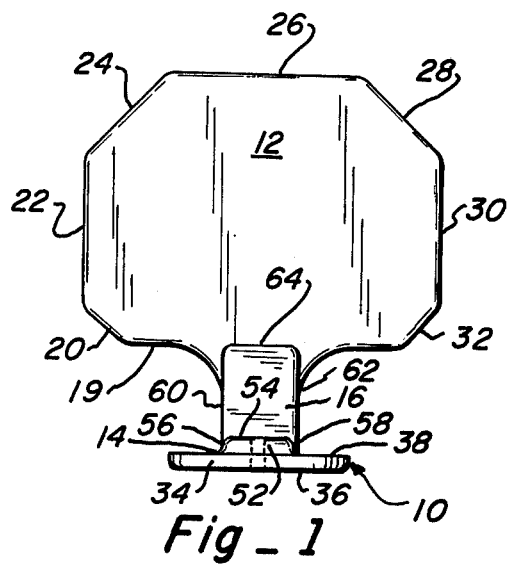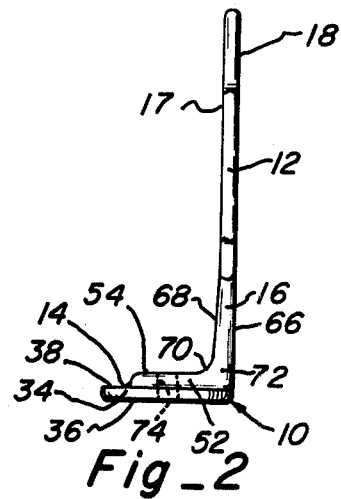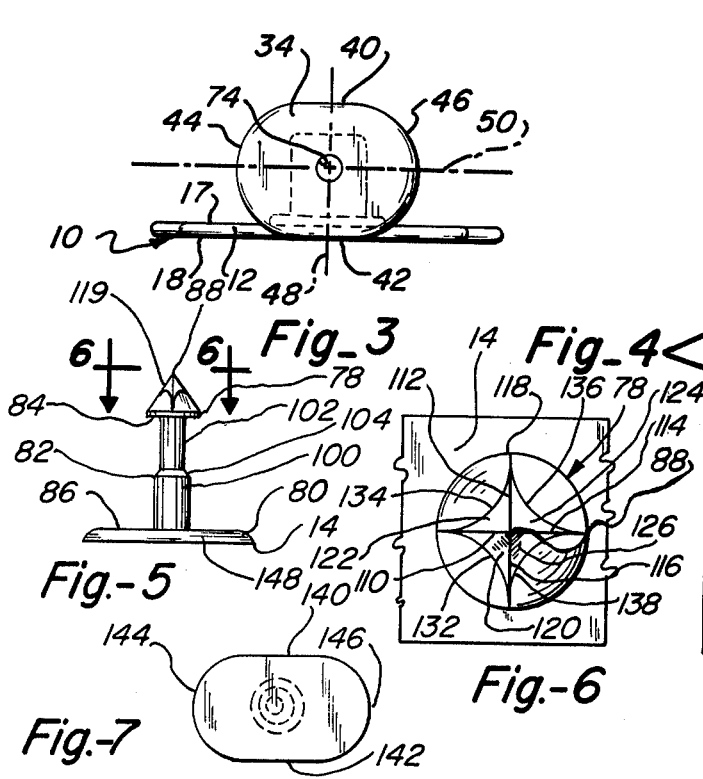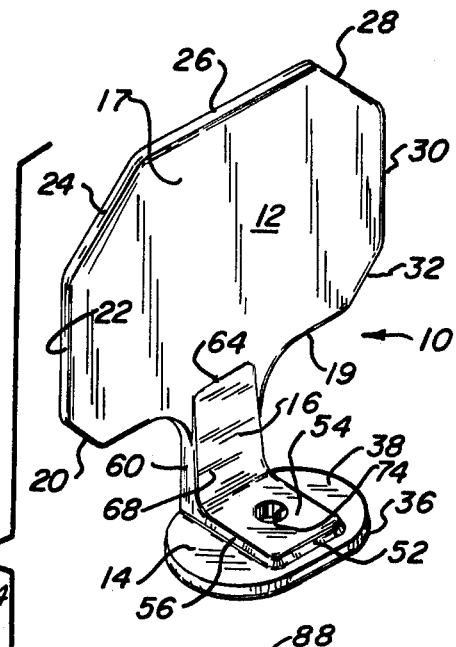

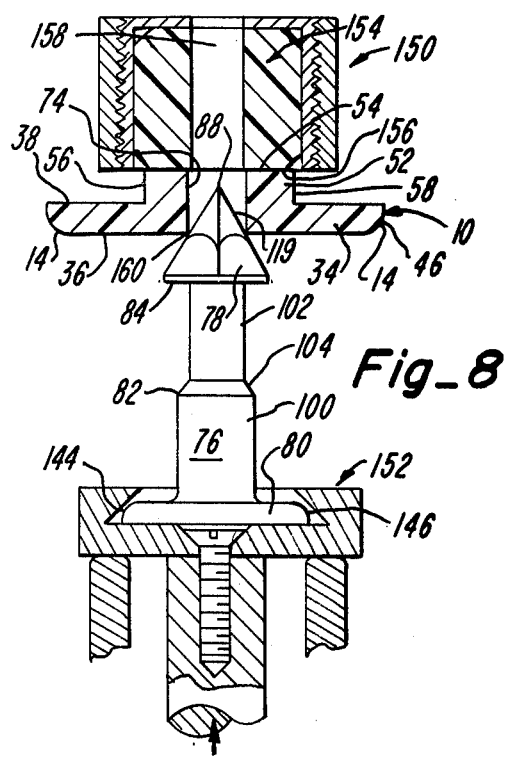
Fig_8
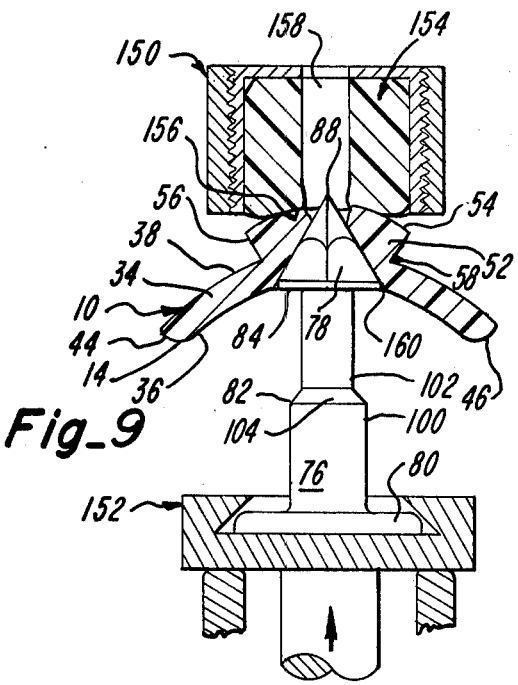
Fig_9
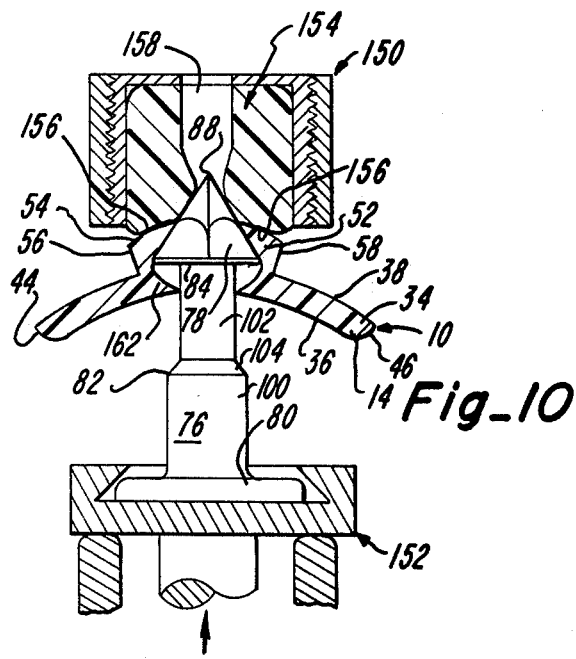
Fig_10
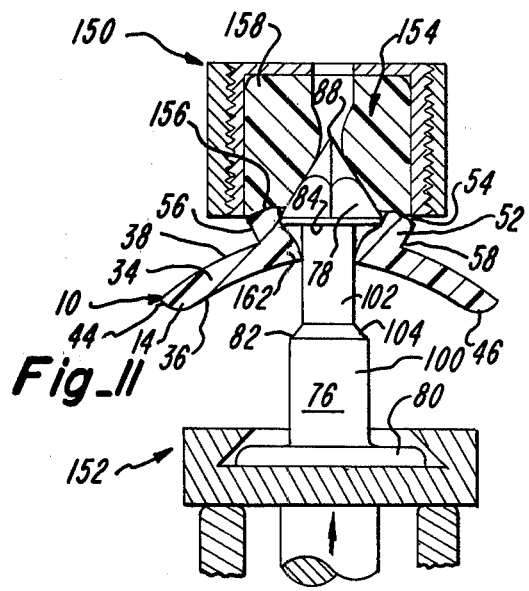
Fig_11
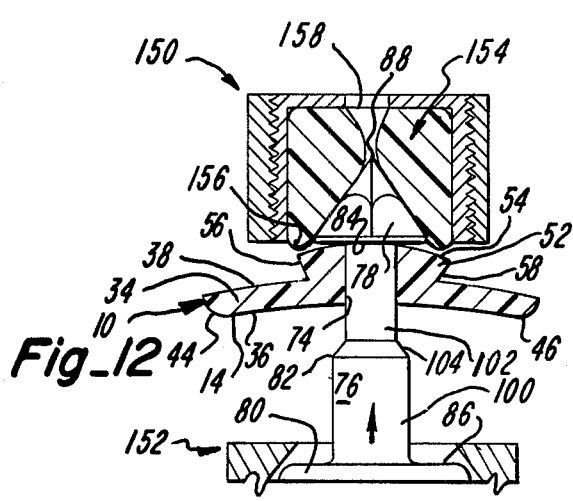
Fig_12

ANIMAL IDENTIFICATION TAG

BACKGROUND AND SUMMARY OF THE INVENTION

This invention relates to animal identification tags and, more particularly, to a stand-up type tag assembly of the type disclosed in my prior U.S. Pat. No. 3,958,353, the disclosure of which is specifically incorporated herein by reference.

The present invention provides a two-piece tag assembly which is particularly well suited to fast and easy application to the ear of an animal. One of the problems with prior art animal tags is the difficulty in attaching the tags to the animal in a manner which is relatively quick and easy while not causing undue injury to the animal and while resulting in permanent attachment to the animal.

The present invention comprises a two-piece tag assembly wherein there are two one-piece members of molded plastic material. The identification member comprises an identification flange portion providing front and rear identification surfaces, a base portion, and a connecting flange portion extending therebetween, the identification member being made of relatively soft highly flexible plastic material such as urethane 80A to 100A Shore hardness. The identification flange portion is laterally offset to one side of the base portion and a reinforcement rib connects the base portion to the connecting flange portion with a relatively small connecting hole extending therethrough and laterally offset from the identification flange portion. The connecting member is preferably made of relatively hard high strength plastic material such as 30% glass filled Nylon 6 and comprises a head portion mounted on the smallest diameter end of a multiple diameter shaft portion extending outwardly from a base portion with the base portion adapted to be located against the inner surface of the animal ear, the shaft portion extending through the animal ear and the connecting hole in the base portion of the identification member, and the head portion retainingly abuttingly engaging the upper outer facing surface of the reinforcement rib to hold the identification member in an upright position on the animal ear.

One of the advantages of the present invention is that the connecting member is relatively easily insertable through the hole in the base of the identification member and thereafter cannot be removed except by forces far in excess of the insertion force. Another advantage is the location of the base portion relative to the identification flange portion when the tag assembly is mounted on the animal so that engagement between the identification portion of the identification member and a foreign object, such as a fence wire, will not result in application of force along the center line of the shaft of the connecting member. In addition, when the identification flange portion is located in a generally forwardly facing position on the ear, it will be flexibly rearwardly bent over so as to cover the connecting head portion and thereby decrease the chance of snagging on a wire or other object. Furthermore, in the present arrangement, there are no holes or openings in the identification flange portion in which to snag any foreign object and the entire front and rear surfaces of the flange portion including the solid one piece connecting portion are solid throughout to reduce the likelihood of failure of the identification portion under load. In addition, the arrangement of the connecting flange portion and the base portion is such as to facilitate assembly and to increase the strength of the assembly to prevent accidental disassembly or breakage in use. In this connection, the thickness of the base portion at the reinforcement rib provides an attachment hole of sufficient strength to prevent accidental withdrawal of the attachment member through the hole after assembly. In addition, the diameter of the attachment hole and the diameter of the shaft portion are such as to enable relatively easy insertion while also providing more than sufficient retention force. Also the construction of the shaft portion of the connecting member readily accomodates ear growth after attachment of the tag assembly.

BRIEF DESCRIPTION OF THE DRAWINGS

FIG. 1 is a side elevational view of an identification member of an identification tag assembly embodying the inventive concepts;

FIG. 2 is a right side elevational view of the identification member of FIG. 1;

FIG. 3 is a bottom view of the identification member of FIG. 1;

FIG. 4 is a side elevational view of an attachment member of the identification tag assembly.

FIG. 5 is a side elevational view of an alternative and presently preferred form of connecting member;

FIG. 6 is a top view of the connecting member of FIG. 5;

FIG. 7 is a bottom view of the connecting member of FIGS. 5 and 6;

FIG. 8 is a partial side elevational view, partially in cross-section showing the tag assembly in association with an applicator tool in an initial position of assembly on an animal ear;

FIG. 9 is a partial side elevational view, partially in cross-section, of the apparatus of FIG. 8 in a subsequent intermediate assembly position relative to FIG. 8;

FIG. 10 is a partial side elevational view, partly in cross-section, of the apparatus of FIGS. 8–9 in a subsequent intermediate assembly portion relative to FIG. 9;

FIG. 11 is a partial side elevational view, partly in cross-section, of the apparatus of FIGS. 8–10 in a subsequent intermediate assembly position relative to FIG. 10; and FIG. 12 is a partial side elevational view, partly in cross-section, of the apparatus of FIGS. 8–11 in the final assembly position.

DETAILED DESCRIPTION OF THE INVENTION

The new and improved type of stand-up ear tag assembly of the present invention is shown to comprise an identification member 10 preferably made of one-piece molded plastic material, such as urethane 80A to 100A Shore hardness, having an upright identification flange portion 12, a transversely extending base portion 14 laterally offset to one side of the flange portion, and a connecting flange portion 16 extending therebetween.

The identification portion is of relatively thin wall thickness of, for example, approximately 1/16 inch, as measured between rear and front side surfaces 17, 18, and may have any conventional peripheral configuration such as the illustrative polygonal configuration defined by edge surfaces 19, 20, 22, 24, 26, 28, 30, 32. Suitable identification or informational indicia may be placed on the front and/or rear surfaces 17, 18.

The base portion 14 comprises an enlarged bottom portion 34 of relatively thin wall thickness of, for example, 1/16 inch as measured between a bottom support surface 36 and an uper surface 38 both of which extend transversely relative to the flange portion 12. bottom portion 34 has a generally elliptical peripheral configuration defined by opposed parallel side edge surfaces 40, 42 and opposed semi-circular side edge surfaces 44, 46. In the presently preferred embodiment, the distance between surfaces 40, 42 is approximately ⅝ inch and the maximum distance between the end portions of surfaces 44, 46 is approximately 1¼ inches. Surface 42 is substantially coplanar with the adjacent side surface 18 of the flange portion 12. The central longitudinal axes of flange portion 12 and base portion 14 are coplanar as indicated by central axis 48 and the other transverse center line 50 of the base portion is transversely offset from the surface 18 of the flange portion approximately 7/16 inch.

The base portion 14 further comprises a rib portion 52 having a thickness of approximately 1/16 inch in the presently preferred embodiment as measured between surface 38 and surface 54. The rib portion is of generally rectangular peripheral configuration and has a width of approximately ½ inch as measured between side surfaces 56, 58 equal to the width of connecting flange portion 16 as measured between side surfaces 60, 62 thereof.

The connecting flange portion 16 is preferably of generally rectangular peripheral configuration with an upper edge surface 64 merging with lower edge surface 19 of the flange portion 12. One side surface 66 of flange portion 16 opposite the base portion 14 is coplanar with surface 18 of flange portion 12 and edge surface 42 of bottom portion 34. The other side surface 68 of flange portion 16 next adjacent the base portion 14 is downwardly outwardly tapered at approximately 5° in the presently preferred embodiment and connected to the upper surface 54 of rib portion 52 by a curved surface 70 to provide a thickened intersection 72 between the rib portion 52 and the flange portion 16.

An annular attachment hole 74, preferably having a relatively small diameter of approximately 5/32 inch, is centrally located in base portion 14 and extends vertically parallel to flange portion 12 and connecting flange portion 16 through both the bottom portion 34 and the rib portion 52.

An attachment member 76, preferably made of one piece of relatively hard plastic material, such as 30% glass filled Nylon 6, is shown to comprise a head portion 78, a base portion 80, and an annular connecting shaft portion 82. An abutment surface 84 on head portion 78 and an abutment surface 86 on base portion 80 are porvided to respectively abut identification member surface 54 and the underside of the ear of an animal in an assembled position (not shown) with shaft portion 82 extending through a puncture wound opening in the animal ear, caused by a relatively hard conical pointed surface 88 of the head portion, and through the annular hole 74 in the relatively soft base portion 14. The dimensional relationships of the attachment member, the thickness of the animal ear, and the base portion of the identification member are such as to firmly seat bottom surface 36 on the upper surface of the animal ear and hold the identification member in an upright outwardly extending position relative to the outer surface of the animal ear. As described in detail in may afore-identified United States Patent, the construction of the identification tag assembly is such as to permit a high degree of visibility of the identification portion while permitting a high degree of flexing of the identification member flange portion 12 relative to the base portion 14 and the animal ear without damage to the tag assembly or injury to the animal.

Referring now to FIGS. 5-7, a presently preferred form of the attachment member is shown to comprise a multidiameter shaft portion 82 having a first relatively large diameter shaft portion 100 of approximately ¼ inch diameter next adjacent the base portion 14 and a second relatively small diameter shaft portion 102 of approximately 3/16 inch diameter next adjacent the head portion 78. Locating and abutment shoulder means, in the form of an annular tapered connecting surface 104 connecting the shaft portions 100, 102, is provided on shaft portion 82 intermediate the abutment surfaces 84, 86, approximately 7/16 inch from surface 86 and approximately 5/16 inch from surface 84, for holding and locating the base portion 14 of the identification member 12 thereon in limited axially slidable relationship relative thereto. Thus, in the initial assembled portion of FIG. 12, there is substantial clearance between surface 36 of the base portion 14 of the identification member and the shoulder means 104 so that, if the thickness of the animal ear is less than the distance between surface 86 of the base portion 80 of the attachment member and the surface 36, the base portion 14 can be moved along shaft portion 102 toward shoulder 104 until the surface 36 is seated on the upper surface of the animal ear. In addition, if the animal is not full grown at the time of application of the tag, the base portion 14 can be moved away from shoulder 104 to accomodate increases in thickness of the animal ear. The relatively small diameter shaft portion 102 also facilitates passage of the conical head portion 78 through hole 74 and retention of the relatively hard base portion 14 by the conical head portion after assembly as hereinafter described. The relatively large diameter shaft portion 100 also provides sufficient strength to prevent breakage of the shaft portion during assembly which has been a major problem with prior art devices.

The presently preferred form of attachment member further comprises a generally conical head portion 78 having four equally spaced relatively hard sharp edged penetrating rib means 110, 112, 114, 116 extending from the sharp conical point 88 toward the surface 84 which has an annular peripheral surface 118. The uppermost portion 119 of the conical head portion, next adjacent the point 88, has a pryamidal configuration defined by flat tapered surfaces 120, 122, 124, 126 which intersect at 45° angles to form the upper portions of the sharp edged penetrating rib means 110, 112, 114, 116 and which are extended axially toward the peripheral edge surface 118 to form the lower portions of the sharp edged penetrating rib means, the flat tapered surfaces 120, 122, 124, 126 merging with the lower conical surface of the head portion 78 as indicated by lines 130, 132, 134, 136.

In addition, the presently preferred form of attachment member further comprises an elongated base portion 80 defined by spaced parallel elongated side surfaces 140, 142 and oppositely curved connecting end surfaces 144, 146, with the base portion having a maximum length of 1 5/32 inches and a maximum width of approximately ⅝ inch so as to be readily nestable in the central main groove found in the upper inner part of the ear of a bovine type animal. The thickness of the base portion 14 may be relatively thin, e.g., approximately 1/16 inch, because of the high strength of the attachment member material which facilitates the application of the tag to the animal by use of an applicator as will be hereinafter described. The peripheral side surface 148 of the base portion is beveled at an angle of approximately 60° for a purpose to be hereinafter described.

Referring now to FIGS. 8–12, the base portion 14 of the aforedescribed identification tag member 10 and the attachment member 76 of FIGS. 5–7 are shown in association with upper and lower jaw portions 150, 152 of a plier-like tag applicator tool such as described in my United States patent application therefor which is being filed concurrently herewith. In general, the upper and lower portions of the applicator tool are movable between open and closed positions to attach the tag to the animal ear by forcing the relatively hard conical head portion 78 of the attachment member 76 through the animal ear from the bottom surface to the upper surface of the central upper portion of the animal ear next adjacent the animal head, as described in my prior U.S. Pat. No. 3,958,353, and then through the hole 74 in the base portion 14 of the identification member 10. While the tag assembly of the present invention may be applied by any suitable applicator tool, the presently preferred applicator tool includes resilient support means 154 for abutting engagement with the upper surface 54 of the rib portion 52 of the identification member 10 and with the peripheral surface of the conical head portion 78 of the attachment member 76 during the assembly process while accomodating the upward movement of the conical head portion 78 beyond surface 54 of the reinforcement rib portion 52. As shown in FIGS. 8–12, the resilient cushion means 154 may be in the form of an annular member made of plastic material such as urethane 80A to 120A Shore hardness providing an annular abutment surface 156 opposite surface 54 and circumjacent bore 74 and an annular bore 158 aligned with bore 74, conical head portion 78, and shaft portion 82.

Referring now to FIG. 8, the applicator tool jaw portions 150, 152 are shown in a partially closed position whereat the upper relatively hard portion 119 of the conical head portion 78 has penetrated and passed through the upper surface of the animal ear, and reached a position in bore 74 of the relatively soft identification member whereat the bottom peripheral edge 160 mades initial contact with the peripheral surface of the conical head portion.

FIG. 9 shows an assembly position subsequent to FIG. 8 whereat the bottom surface 84 of the conical head portion has passed completely through the animal ear and is located substantially parallel to the bottom edge 160. The construction of the relatively soft, and enlarged portion 34 and the relatively soft reinforcement rib portion 52 and the relatively hard conical head portion 78 is such that the enlarged portion and the reinforced rib portion bow outwardly on both sides of the central axis 48 with surfaces 36, 38, 54 having substantial curvatures and side surfaces 56, 58 being substantially outwardly upwardly inclined relative to the axes of hole 74, conical head portion 78, and shaft portion 82. The hole 74 is generally resiliently enlarged by the conical head portion.

FIG. 10 shows an assembly position subsequent to FIG. 9 whereat the bottom surface 84 is located approximately midway along hole 74 in general alignment with the intersection of upper surface 35 and side surfaces 56, 58. The construction of the enlarged portion 34 and the reinforcement rib portion 52 in relationship to the conical head portion 78 and relatively small diameter shaft portion 102 is such that the outward bowing acting continues with further opening of the bore 74 to accomodate the conical head portion. At the same time, the lower portions 162 of the material circumjacent hole 74, which are subject to the forces applied by the conical head portion and which store energy resulting therefrom, begin to expand inwardly toward reduced diameter shaft portion 102 and apply force behind the conical head portion in the upward direction of movement thereof to facilitate further axial upward displacement thereof through the bore 74.

FIG. 11 shows an assembly position subsequent to FIG. 10 whereat the bottom surface 84 is located approximately ¾ of the way through hole 74. The construction of the enlarged base portion 34 and the reinforcement rib portion 52 in relationship to the conical head portion 78 and the relatively small diameter shaft portion 102 is such that the outward bowing action continues with further opening of the top portion of bore 74 and further closing of the bottom portion 162 of bore 74 with maximum internal forces in the base portion 14 being exerted against surface 84 to urge the conical head portion on through the bore. In fact, at this point, the internally generated forces are generally sufficient to complete the movement of the conical head portion through the bore 74 even upon removal of jaw applied force.

FIG. 12 shows the final assembly position after surface 84 has passed beyond upper surface 54. At this point, some residual bowing of base portions 34 and 52 is still evident so that some upwardly directed internal forces are still effective against surface 84. The residual bowing effect is probably the result of the difference of approximately 1/32 inch in the diameter of the hole 74 and the shaft portion 102 which creates frictional force between those surfaces retarding further movement of the base portion 14 relative to the shaft portion 102. Since the upper surface of the animal ear has a convex curvature, the convex curvature of bottom surface 36 may be an advantage. In any event, if force is applied to the base portion 14 opposite to the assembly forces, the base portion 14 will slide down the shaft portion 102 toward the top surface of the animal ear with relief of remaining residual forces and termination of the bowed condition. In any event, the relatively high degree of flexibility of the enlarged rim portion 34 enables conformation to the upper curved surface of the animal ear. Nonetheless, the relatively large area of abutting engagement between surface 84 of head portion 78 and the upper surface 154 of the reinforcement rib portion 52; the frictional engagement between the surface of bore 74 and reduced diameter shaft portion 102; and the rigidifying effect of reinforcement rib 52 against movement of the conical head portion in a direction opposite to the direction of insertion, preclude the removal of the identification member relative to the attachment member under substantially any forces which may be accidentally applied to the identification member after mounting on the animal ear.

Thus, the arrangement and construction of the base portion 14 of the identification member, and the conical head portion 78 and the shaft portion 82 of the attachment member provide application force assist means for assisting the insertion of the conical head portion 78 through hole 74 and provide retention means effective after insertion for preventing removal and dissassociation of the base portion 14 of the identification member from the conical head portion 78 of the attachment member while also providing adjustment means for variable axial positioning of the base portion 14 relative to the shaft portion 82.

It is contemplated that the inventive concepts herein disclosed may be variously otherwise embodied and it is intended that the appended claims be construed to include alternative embodiments of the invention except insofar as limited by the prior art.

The invention claimed is:

1. An animal identification tag assembly comprising:
    an identification member adapted to be mounted in a generally outwardly extending upright position on the upper outer surface of an animal,
        a base portion of said identification member having a first lower abutment surface adapted to be seated on the upper outer surface of the animal ear and having peripheral edge surfaces defining said first abutment surface;
        a connecting hole extending through said base portion transversely to said first abutment surface, and centrally located in said base portion in inwardly spaced relationship to said peripheral edge surfaces;
        a second upper abutment surface on said base portion of said identification member adjacent said connecting hole therein and spaced from said first lower abutment surface;
        an identification flange portion of said identification member extending transversely outwardly from said base portion and adapted to extend outwardly therefrom in an upright position relative to the ear of an animal;
        said identification flange portion being connected to said base portion adjacent one of the peripheral edge surfaces thereof and being laterally offset and spaced from said connecting hole and said second abutment surface; and
    a connecting member adapted to be mounted in connecting retaining engagement with said identification member,
        a base portion of said connecting member having a third abutment surface adapted to be seated on the upper inner surface of the animal ear;
        a connecting shaft portion extending transversely outwardly relative to said base portion of said connecting member and adapted to extend through the animal ear and through said connecting hole in said base portion of said identification member;
        a head portion on said shaft portion adapted to be located laterally outwardly beyond said base portion of said identification member and having a fourth abutment surface adapted to retainingly engage said second upper abutment surface adjacent said connecting hole in said identification member in laterally offset spaced relationship to said identification flange portion.

2. The invention as defined in claim 1 and wherein: said identification member being made of a relatively soft flexible plastic material and said connecting member being made of a relatively hard inflexible plastic material.

3. The invention as defined in claim 1 and further comprising:
    a connecting flange portion of smaller peripheral configuration than said identification flange portion and said base portion of said identification member connectingly extending therebetween.

4. The invention as defined in claim 1 and wherein: said connecting flange portion having a first side surface coplanar with a side surface of said identification flange portion and a second oppositely spaced and facing side surface downwardly outwardly inclined relative thereto and connected to said base portion of said identification member to provide an intersection therebetween of increased thickness relative to the intersection between said connecting flange portion and said identification portion.

5. The invention as defined in claim 1 and further comprising:
    a reinforcement rib means on said base portion of said identification member for providing a section of increased thickness therein, and
    said connecting hole being located in said reinforcement rib.

6. The invention as defined in claim 2 and wherein:
    said identification member being made of a urethane material having a Shore hardness of approximately 80A to 100A; and
    said connecting member being made of a substantially harder material than said urethane material.

7. The invention as defined in claim 6 and wherein:
    said connecting member being made out of a 30% glass filled Nylon 6 material.

8. The invention as defined in claim 5 and wherein said reinforcement rib means having a width less than the width of other portions of said base portion and being elongated along a central axis of said base portion extending transversely to said identification flange portion of said identification member.

9. The invention as defined in claim 1 and wherein said connecting shaft portion of said connecting member comprising:
    a first shaft portion of relatively large diameter next adjacent said base portion of said connecting member; and
    a second shaft portion of relatively small diameter next adjacent said head portion.

10. The invention as defined in claim 1 and wherein said second shaft portion of relatively small diameter being of lesser diameter than said connecting hole.

11. The invention as defined in claim 9 and wherein:
    said second shaft portion having an axial length greater than the distance between said first lower abutment surface and said second upper abutment surface on said base portion of said identification member.

12. The invention as defined in claim 11 and further comprising:
    shoulder means on said first shaft portion for engagement with said base portion of said identification member to limit axial displacement of said identification member along said second shaft portion.

13. The invention as defined in claim 1 and wherein said head portion further comprising a plurality of circumferentially spaced relatively sharp edged rib means extending generally axially therealong.

14. The invention as defined in claim 13 and wherein said head portion further comprising:
    a relatively sharp point at the axially outermost end thereof; and
    a generally conical side surface extending between said point and said fourth abutment surface.

15. The invention as defined in claim 14 and wherein said head portion further comprising:

a pyramidal upper surface portion defined by flat intersecting side surfaces forming said point and said rib means.

16. The invention as defined in claim 1 and wherein said bore portion and said connecting hole of said identification member and said connecting shaft portion and said head portion of said connecting member being constructed and arranged to provide application force assist means for applying axially outwardly directed forces on said head portion during assembly of said identification member and said connecting member.

17. The invention as defined in claim 16 and wherein said base portion and said connecting hole of said identification member and said head portion and said shaft portion of said connecting member being constructed and arranged to provide retention means effective after connection of said identification member and said connecting member for preventing disconnection under any forces accidentally applied thereto while mounted on the animal.

18. The invention as defined in claim 17 and wherein:
said arrangement and construction of said base portion and said connecting hole portion in said identification member comprising:
a relatively wide elongated enlarged resiliently flexible lower base portion;
a relatively narrow elongated reduced resiliently flexible upper base portion;
said attachment hole extending through said lower base portion and said upper base portion and being located in alignment with the central longitudinal axis of each portion;
the application of axial forces by said head portion to said lower base portion and said upper base portion during passage of said head portion through said attachment hole during assembly causing convex outward bowing of both said lower base portion and said upper base portion relative to the direction of application of force on said head portion and residual forces effective to assist the passage of said head portion through said attachment hole.

19. The invention as defined in claim 18 and wherein the application of opposite axial forces to said identification member and said connecting member after assembly causing convex inward bowing of both said lower base portion and said upper base portion effective to increase the retention forces between and base portion of said identification member and said shaft portion and said head portion of said connecting member.

20. The invention as defined in claim 1 and wherein:
said identification member being made of a relatively soft flexible plastic material; and
said conical head portion of said connecting member being made of a relatively hard inflexible material.

21. The invention as defined in claim 2 and wherein:
said identification member being made of a urethane material having a Shore hardness of approximately 80A to 100A; and
at least said head portion of said connecting member being made of a substantially harder material than said urethane material.

22. The invention as defined in claim 9 and further comprising:
shoulder means on said first shaft portion for engagement with said base portion of said identification member to limit axial displacement of said identification member along said second shaft portion.

23. The invention as defined in claim 13 and wherein said head portion further comprising:
a relatively sharp point at the axially outermost end thereof; and
a pyramidal upper surface portion defined by flat intersecting side surfaces forming said point and said rib means.

24. The invention as defined in claim 1 and wherein said base portion and said connecting hole of said identification member and said head portion and said shaft portion of said connecting member being constructed and arranged to provide retention means effective after connection of said identification member and said connecting member for preventing disconnection under any forces accidentally applied thereto while mounted on the animal.

25. The invention as defined in claim 1 and wherein:
said arrangement and construction of said base portion and said connecting hole portion in said identification member comprising:
a relatively wide elongated enlarged resiliently flexible lower base portion;
a relatively narrow elongated reduced resiliently flexible upper base portion;
said attachment hole extending through said lower base portion and said upper base portion and being located in alignment with the central longitudinal axis of each portion;
the application of axial forces by said head portion to said lower base portion and said upper base portion during passage of said head portion through said attachment hole during assembly causing convex outward bowing of both and lower base portion and said upper base portion relative to the direction of application of force on said head portion and residual forces effective to assist the passage of said head portion through said attachment hole.

26. The invention as defined in claim 25 and wherein the application of opposite axial forces to said identification member and said connecting member after assembly causing convex inward bowing of both said lower base portion and said upper base portion effective to increase the retention forces between said base portion of said identification member and said shaft portion and said head portion of said connecting member.

27. The invention as defined in claim 26 and wherein:
said identification member being made of a urethane material having a Shore hardness of approximately 80A to 100A; and
at least said head portion of said connecting member being made of a substantially harder material than said urethane material.

28. The invention as defined in claim 27 and wherein said connecting shaft portion of said connecting member comprising:
a first shaft portion of relatively large diameter next adjacent said base portion of said connecting member; and
a second shaft portion of relatively small diameter next adjacent said head portion.

29. The invention as defined in claim 28 and further comprising:
shoulder means on said first shaft portion for engagement with said base portion of said identification member to limit axial displacement of said identification member along said second shaft portion.

* * * * *